(No Model.) 2 Sheets—Sheet 1.

D. C. RIPLEY.
MANUFACTURE OF GLASSWARE.

No. 364,298. Patented June 7, 1887.

Witnesses.
H. L. Gill.
N. B. Corwin

Inventor.
Daniel C. Ripley
by his attys
Bakewell & Kerr (No Model.)  2 Sheets—Sheet 2.

D. C. RIPLEY.
MANUFACTURE OF GLASSWARE.

No. 364,298.  Patented June 7, 1887.

Witnesses.
H. L. Gill
J. K. Smith

Inventor.
Daniel C. Ripley
By his attys
Bakewell & Kerr

UNITED STATES PATENT OFFICE.

DANIEL C. RIPLEY, OF PITTSBURG, PENNSYLVANIA.

MANUFACTURE OF GLASSWARE.

SPECIFICATION forming part of Letters Patent No. 364,298, dated June 7, 1887.

Application filed January 15, 1887. Serial No. 224,428. (No model.)

*To all whom it may concern:*

Be it known that I, DANIEL C. RIPLEY, of Pittsburg, in the county of Allegheny and State of Pennsylvania, have invented a new and useful Improvement in the Manufacture of Glassware; and I do hereby declare the following to be a full, clear, and exact description thereof.

My invention relates to the manufacture of globe-shaped articles of glassware having a foot; and it consists of an improved method whereby, among other advantages, I am enabled to make such articles of a large size with great economy of manufacture and great precision and uniformity of product.

To enable others skilled in the art to make and use my invention, I will now describe it by reference to the accompanying drawings, in which—

Figure 1:
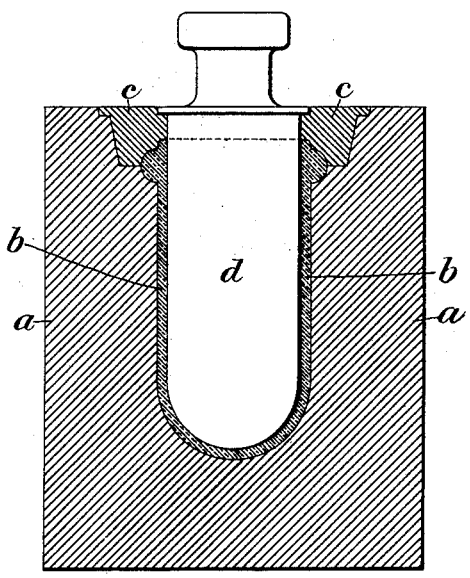
Figure 2:
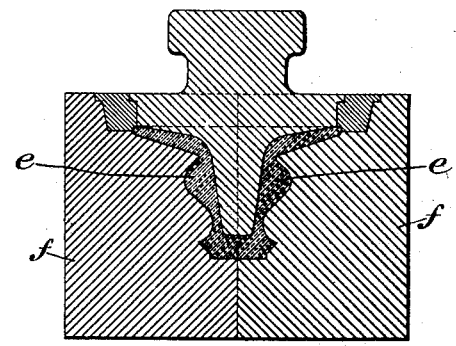
Figure 3:
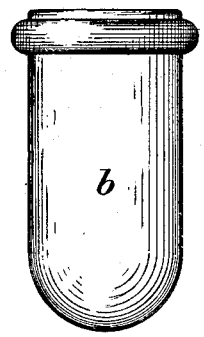
Figure 4:
Figure 6:
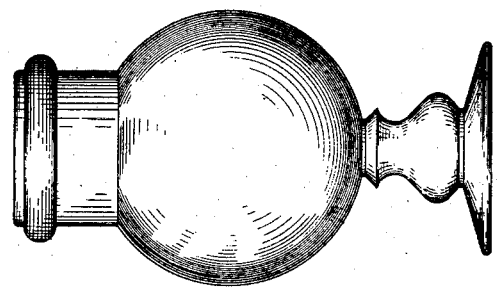
Figure 5:
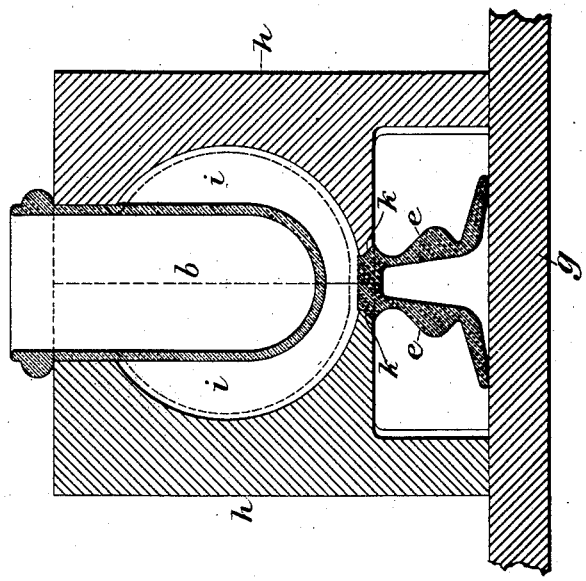

Figure 1 is a vertical section of a mold for pressing a blank to constitute the body of the article. Fig. 2 is a view of the mold for pressing the foot. Figs. 3 and 4 are views of the products of said molds. Fig. 5 is a view of a mold in which the body of the article is placed and the foot and body united together. Fig. 6 is a view of the article.

Like letters of reference indicate like parts in each.

Briefly stated, the steps of my improved process consist in first forming a pressed blank, like that shown in Fig. 3, in the mold shown in Fig. 1; then forming a foot, like that shown in Fig. 4, in the mold shown in Fig. 2; and, lastly, placing the foot under the mold shown in Fig. 5, reheating the blank shown in Fig. 3, inserting it in the mold in Fig. 5, and blowing it out to the required shape until it unites with the foot.

The mold $a$ for forming the blank $b$ is an ordinary drop-mold having a ring, $c$, and plunger $d$. The requisite quantity of plastic glass is placed in the mold $a$ and pressed into the blank $b$ by the action of the plunger $d$. The foot $e$ is made in an ordinary partible mold, $f$, by pressing in a similar manner. It is then taken and placed on a stand, $g$. A partible blow-mold, $h$, having a molding-cavity, $i$, of the shape of the finished article, and a lower opening, $k$, of the shape of the upper end of the stem of the foot, is placed on a stand above the foot and closed, so that the stem of the latter shall enter the hole $k$. The blank $b$ is then taken and reheated, inserted into the mold $h$, and blown until its major portion is expanded to fill the molding-cavity $i$ and its lower end unites with the upper end of the foot $e$. The mold is then opened, the article removed, annealed, and finished in the usual way, and the product is shown by Fig. 6.

It will be noticed that the body of the article is at first a pressed blank. This enables me to produce this part of the article not only with great cheapness, but with great uniformity, which will govern and characterize the finished article. In like manner the foot is made at small cost. All expense of handwork is dispensed with in connection with it; and as the blank $b$ is separate from the foot, and is the only part under manipulation during the blowing operation necessary in making the globe or expanded body, it is the only part that is reheated. This enables me to preserve the molded character of the foot and to prevent distortion in the finished article. Moreover, I am enabled, for the same reason, to make very large articles having large heavy feet and stems, which would be impossible if the foot were pressed as a part of the blank $b$, because the reheating of the body of the blank which is to be expanded by the blowing would soften the stem, and, by reason of the weight of the foot, would cause not only the stem, but the body, to be distorted.

I am aware that lamp-bowls have been blown on a pressed foot and stem; but I know of no case in which an article has been formed by reheating and blowing a previously-pressed blank upon a previously-pressed foot.

What I claim as my invention, and desire to secure by Letters Patent, is—

The method herein described of forming glass articles, which consists, first, in pressing a hollow blank, and, second, reheating the same and blowing it out into shape, and at the same time uniting it to a previously-formed foot or other part, substantially as and for the purposes described.

In testimony whereof I have hereunto set my hand this 31st day of December, A. D. 1886.

DANIEL C. RIPLEY.

Witnesses:
 W. B. CORWIN,
 THOMAS B. KERR.